United States Patent [19]
Benton

[11] Patent Number: 4,782,684
[45] Date of Patent: Nov. 8, 1988

[54] BENDING MACHINE

[76] Inventor: Ronald E. Benton, "Mount Royal", Liphook Road, Headley, Hampshire GU35 8LL, England

[21] Appl. No.: 45,391

[22] Filed: May 1, 1987

[30] Foreign Application Priority Data

May 7, 1986 [GB] United Kingdom ............... 8611153

[51] Int. Cl.⁴ ..................... B21D 7/024; B21D 43/00
[52] U.S. Cl. ..................................... 72/307; 72/217; 72/388; 72/453.01; 72/294; 137/580
[58] Field of Search ............... 72/307, 306, 388, 384, 72/216–219, 149, 156, 453.01, 453.02, 294; 137/580, 597

[56] References Cited

U.S. PATENT DOCUMENTS

| | | |
|---|---|---|
| 2,254,192 | 8/1941 | White .................................. 137/580 |
| 2,313,438 | 3/1943 | Hoelscher ........................... 137/580 |
| 3,776,270 | 12/1973 | Wanger .............................. 137/580 |
| 3,908,695 | 9/1975 | Dunbar ............................... 137/580 |
| 4,252,147 | 2/1981 | Gerber et al. ....................... 137/580 |
| 4,555,924 | 12/1985 | Remy et al. .......................... 72/307 |
| 4,665,731 | 5/1987 | Yagi et al. ............................ 72/307 |

FOREIGN PATENT DOCUMENTS

| | | | |
|---|---|---|---|
| 1204772 | 1/1960 | France ................. 137/580 |
| 2437512 | 5/1980 | France ................. 137/580 |
| 781474 | 11/1980 | U.S.S.R. ............... 137/580 |

Primary Examiner—Daniel C. Crane
Attorney, Agent, or Firm—Berman, Aisenberg & Platt

[57] ABSTRACT

A bending machine having a rotary bending head to which fluid pressure is transmitted via a fluid flow or fluid pressure transmission device comprising a fixed block and a rotary shaft mounted in relation to the fixed block so as to be rotatable relative thereto. The fixed block has at least one passageway through it extending to the rotary shaft, and the rotary shaft has at least one annular groove in registration with the fixed block passageway and at least one axially extending passageway in communication with the annular groove. As a result, the axial passageway is in communication with the fixed block passageway independently of the angular position of the rotary shaft relative to the fixed block.

3 Claims, 4 Drawing Sheets

BENDING MACHINE

The present invention relates to a bending machine.

A problem arises when one part of a machine rotates relative to another, and fluid flow or pressure has to be transmitted from one of the parts to the other independently of their relative positioning or relative movement, especially (although not exclusively) when there is more than one flow or pressure that has to be transmitted.

The present invention seeks to overcome this problem.

Accordingly, the present invention is directed to a bending machine having a rotary bending head to which fluid pressure is transmitted via a fluid flow or fluid pressure transmission device comprising a fixed component and a rotary component mounted in relation to the fixed component so as to be rotatable relative thereto, in which the fixed component has a passageway through it extending to the rotary component, and the rotary component has an annular groove or other recess in registration with the fixed component passageway and an axially extending passageway in communication with the annular groove or other recess, so that the axial passageway is in communication with the fixed component passageway independently of the angular position of the rotary component relative to the fixed component.

A particularly useful embodiment of such a device has the rotary component constituted by a shaft, a plurality of passageways in the fixed component, respective annular grooves or other recesses, one for each passageway of the fixed component, spaced apart along the shaft, and a corresponding plurality of axially extending passageways through the shaft, so that each and every passageway of the fixed component is in communication with its respective axially extending passageway through the shaft independently of the axial position of the shaft relative to the fixed component.

Such a construction enables the pressure or flow of an hydraulic or pneumatic working fluid in the different passageways of the shaft to be controlled by control means on the fixed part.

Preferably, there is an annular seal between each annular groove or recess, to form a seal between the fixed component and the shaft, and so inhibit the pressure or flow of fluid in one groove or recess affecting that in another.

An example of a machine which incorporates a device made in accordance with the present invention is illustrated in the accompanying drawings in which.

Figure 1:
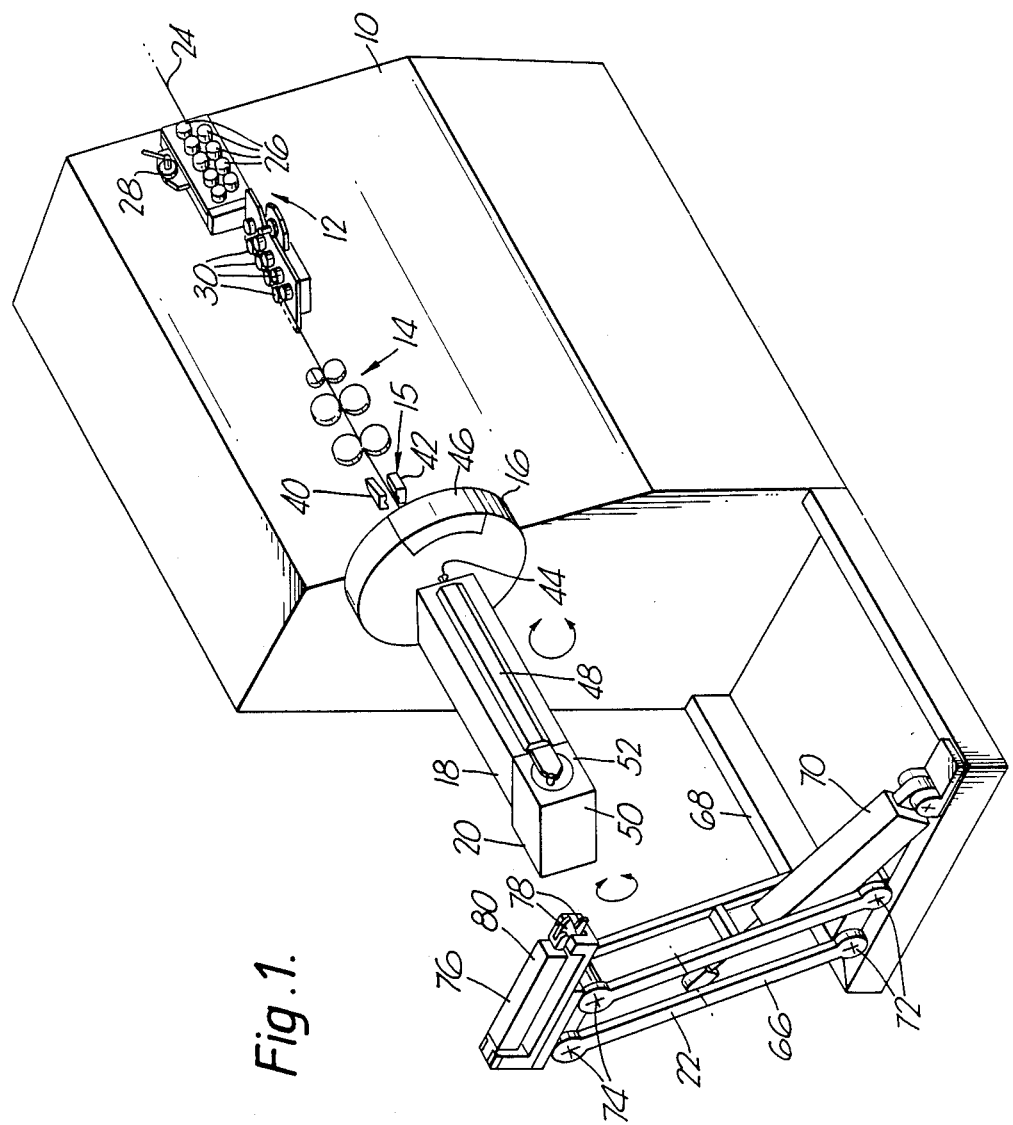
FIG. 1 is a perspective view of the machine from above and to one side thereof.
Figure 2:
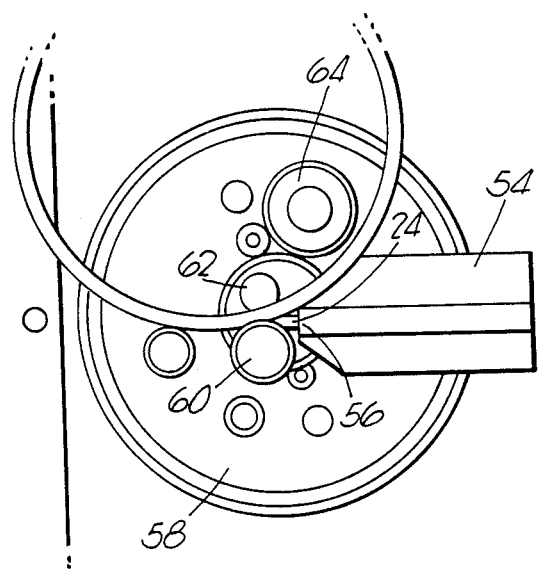
FIG. 2 is a side view of parts of a bending head of the machine.

FIG. 1 shows a bending machine for bending wire, tubing or other elongate material. It comprises a support structure 10 on which is mounted, in spacial sequence from right to left in that Figure, a straightener 12, a feed unit 14, a clamp 15, a bending head mounting wheel 16, a bending head mounting arm 18, a bending head 20, and a crop unit 22. In FIGS. 1 and 2, these units are all dimensioned and constructed for bending a wire 24. However, the units may be adjusted or replaced by parts which are suitable for bending other dimensions and forms of elongate material, such as tubing.

The straightener 12 comprises a first set of nine rollers 26 arranged in a first line of five rollers on one side of an axis of the machine on which the wire 24 lies, and a second line of four rollers on the other side of this axis. Adjuster means 28 are provided to enable the separation of the two lines of rollers to be adjusted so that all the rollers engage the wire 24. A second set of nine rollers 30 is also provided adjacent to the first set, also extending along the axis of the machine but having the plane in which the rollers lie at right angles to the plane in which the first set of rollers 26 lies.

The clamp 15 comprises two blocks 40 and 42 disposed adjacent to and on opposite sides of the machine axis. The two blocks are moveable towards and away from one another to clamp and release the wire 24 respectively.

The wheel 16 is mounted for rotation about the machine axis up to 360 degrees in both senses of rotation. It is formed with a hole 44 through its centre to allow the wire 24 or other elongate material to pass through it. The arm 28 is mounted on this wheel so that it extends along and adjacent to the machine axis. A counterbalancing weight 46 may be provided on the wheel 16 on the opposite side thereof to the arm 18. The arm 18 is provided on that side thereof which faces the machine axis, with a straight guide 48 through which the wire 24 passes, to keep that section of the wire 24 which is immediately upstream of the bending head, straight and true.

The bending head 20 comprises a mounting block 50 at the end of the mounting arm 18 which is furthest from the wheel 16. The block 50 has a face 52 which lies in the same plane as that of the face of the arm 18 on which the straight guide 48 is mounted. Bending components mounted on that face 52 are shown in greater detail in FIG. 2. They comprise an extension 54 of the straight guide 48 so that the wire exits the guide at an end 56 of the extension 54. This end is close to the centre of the bending rotor 58. Two fixed pins or rollers 60 and 62 are positioned adjacent to the axis of the rotor 58 and are fixed relative to the guide extension 54. They are positioned on opposite sides of the wire 24 where it leaves the guide extension 54. A bending roller 64 projects outwardly from the rotor 58 and is mounted thereon so that the roller axis can be selectively positioned, by rotation of the rotor 58, on any point which lies on a near complete circle centred on the axis of the rotor 58.

The crop unit 22 comprises a parallelogram linkage 66 mounted on a frame 68 which is part of the support structure 10. The linkage 66 is moveable by means of a hydraulic piston and cylinder arrangement 70 to rock the linkage to and fro about its lower fixed end 72. On the top of the linkage 74 there is mounted a cutter 76 the blades 78 of which are close to the machine axis, and can be moved into a position in which they are on opposite sides of the axis, to cut the wire 24, by means of the piston and cylinder arrangements 70 acting on the parallelogram linkage 66. The cutter 76 is provided with a power drive 80 to force the blades 78 together to effect cutting of the wire 74.

All the power drives for the machine, including those for the feed unit 14, the clamp 15, the mounting wheel 16, the bending head 20, the cutter 76, and the hydraulic piston and cylinder arrangement 70 operate automatically, under the command of electrical signals issued by a programmable computer.

Operation of the machine is as follows: a wire 24 is threaded through the straightener 12, the feed unit 14, the clamp 15, the wheel 16, the guide 48 and the extension guide 54. Once the end of the wire 24 has reached the feed unit 14, the latter may assist in this operation. With the wire 24 so threaded, the machine may be put into automatic action in accordance with a programme which has been keyed into the computer. A wire 24 is fed through the machine by means of the feed rollers 32 and 34, and the distances by which the wire is so fed is simultaneously mesaured by the metering roller 36. If the wire is stopped during the bending operation, by stopping the feed rollers 32 and 34, the clamp 15 is automatically operated to ensure that the wire cannot be shifted axially or twisted during a bending operation. To provide a straight section of wire in the finished article, the wire is simply fed through the machine by the feed rollers 32 and 34 for the required distance measured by the metering roller 36. To bend the wire through a given angle in the plane of the face 52 of the bending head 20, the feed rollers 32 and 34 are stopped, the clamp 15 closes on the wire 34, and the wire at the bending head 20 is bent by the bending roller 64 as it is rotated by the roller 58 through the required angle in relation to the fixed rollers 60 and 62.

If the wire is to be bent upwards as viewed in FIG. 2, the roller 64 is retracted into the rotor 58 which can now be rotated in a clockwise sense until the roller 64 passes completely underneath the guide extension 54, whereafter the roller 64 is released to its projecting position and rotation of the rotor 58 is continued until the roller 64 is brought into contact with the wire 24. Rotation of the rotor 58 beyond this position now bends the wire around the upper fixed roller 62 through the required angle as determined by the computer programme. The wire 24 may be bent in the other direction in the plane 52 by the reverse action in which the wire is bent around the lower of the fixed rollers 60. Alternatively, this reverse action can be effected by rotation of the whole bending wheel, arm and head asembly through 180 degrees. This avoids the need to retract the roller 64. A steady curve in the wire can be obtained by positioning the bending roller 64 at the required position in relation to the fixed rollers 60 and 62, and, with the bending rollers so positioned, feeding the wire 24 in the forward direction in the machine by means of the feed rollers 32 and 34.

The wire may be bent in any other plane by being held against twisting by the clamp 15, and by rotation of the mounting wheel 16. This changes the plane of the face 52 without moving the wire. The wheel 16 is rotatable in this way through 360 degrees from its starting position in a clockwise sense and also through 360 degrees from that starting position in an anticlockwise sense. This enables any given rotational position of the bending head 20 to be reached by rotation of the wheel 16 in either one of the two senses. As a result, a particular setting of the bending head may be accessed by rotation of the wheel 16 in one sense which may be inaccessible by rotation in the other sense owing to obstruction by a particular configuration of wire that has already been bent.

When the various bending operations have been completed for a given article of wire, the latter is fed through the machine until the desired end of the article is positioned immediately adjacent to the crop unit 22. The piston and cylinder arrangement 70 is then operated by the computer to move the parallelogram linkage 66 and so to bring the blades 78 to opposite sides of the wire 24 at that desired end. The cutter 76 then cuts the wire at that point to free the finished article from the rest of the wire 24. If necessary, the wire 24 is then reverse-fed to bring the cut end back to the centre of the bending rotor 58.

Because the bending head, rather than the wire, is rotated relative to the machine, the wire does not have to be rotated to be bent into a three-dimensional shape. An advantage is thereby obtained that the wire 24 may be fed directly from a large coil of the material. However, this raises problems with power transmission from the main support structure 10 of the machine to the bending head 20. Rotation of the rotor 58 and extension and retraction of the bending roller 64 is performed hydraulically. In some machines there may be a number of further operations that the bending head performs hydraulically, independently of rotation of the rotor 58 and extension and retraction of the bending roller 64. One way of achieving such transmission is by way of the device shown in FIGS. 3 and 4. This is not shown in FIG. 1, but is positioned immediately to the rear of the wheel 16 in that Figure.

The device comprises a housing 90 within which is provided a bearing 92 which supports a shaft 94 in a manner which allows rotation of the shaft about its axis relative to the housing 90. Drive means (not shown) are arranged to rotate the shaft intermittently or continuously. A number of axially extending passageways in the form of bores 98, corresponding to the required number of hydraulic transmission lines, are drilled through the shaft 94. Respective annular grooves 100 are machined around the shaft 94. The grooves are spaced apart axially along the shaft 94. Respective through drillings 102 connect each annular groove to its associated axially extending bore 98.

A manifold block 103 is fitted around the shaft 94, and is fixed relative to the housing 90 by an anchor block 104. The block 103 is provided with respective holes 110, one for each transmission line, and the grooves 100 are respectively in register with these holes 110. Thus the holes 110 extend all the way to the shaft 94, so that each groove 100 brings a hole 110 into communication with an associated axially extending bore 98.

To prevent hydraulic fluid from passing from one annular groove to the next, thus making the device ineffective, annular hydraulic seals 112 are fitted around the shaft 94 between each pair of adjacent annular grooves 100. In order to prevent wear between the seals 112 and the manifold block 103, bearing strips 114 are fitted at each end of the grooved section of the shaft 94.

Figure 3:
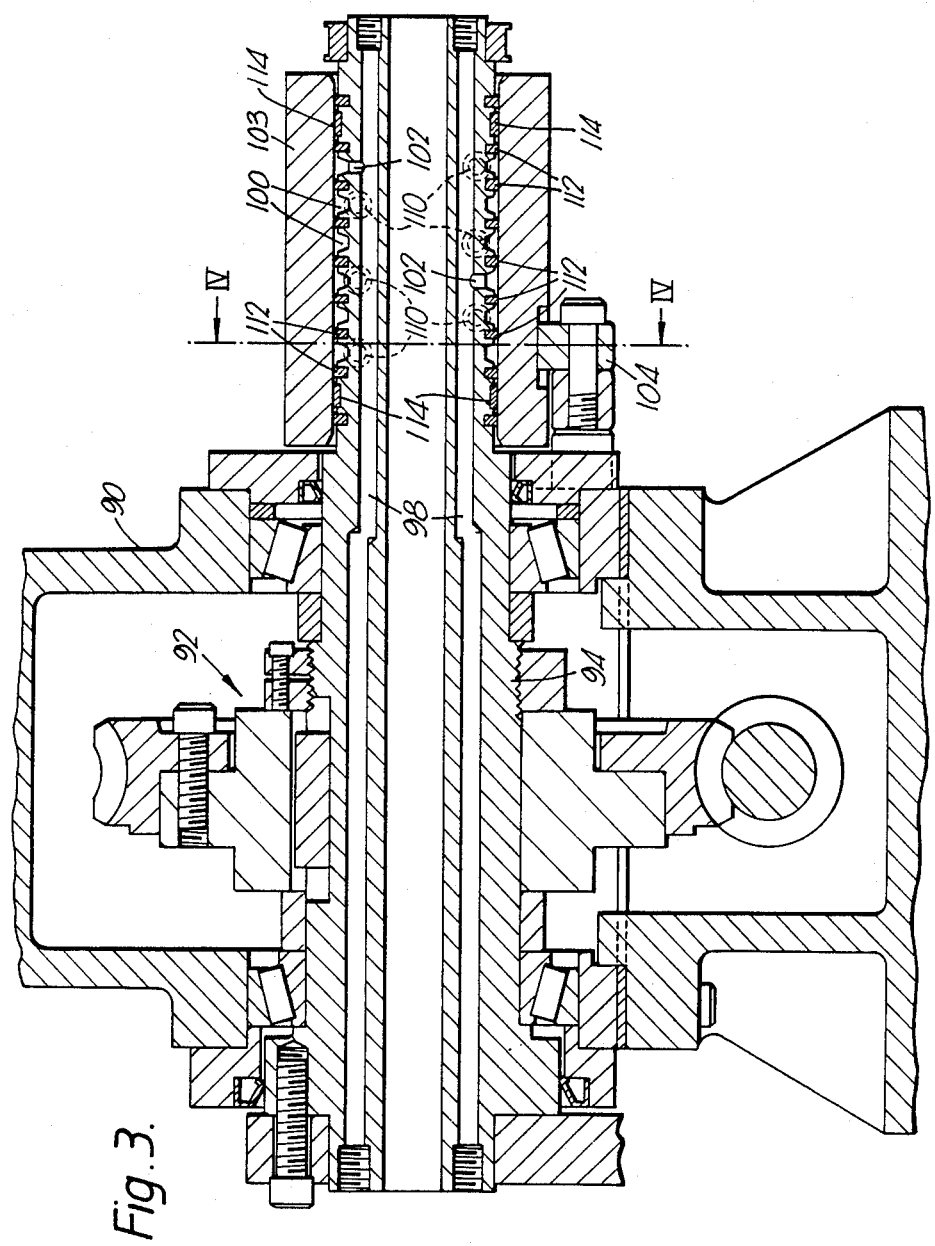
FIG. 3 is an axial sectional view of a fluid flow or pressure transmission device of the machine shown in FIGS. 1 and 2.
Figure 4:
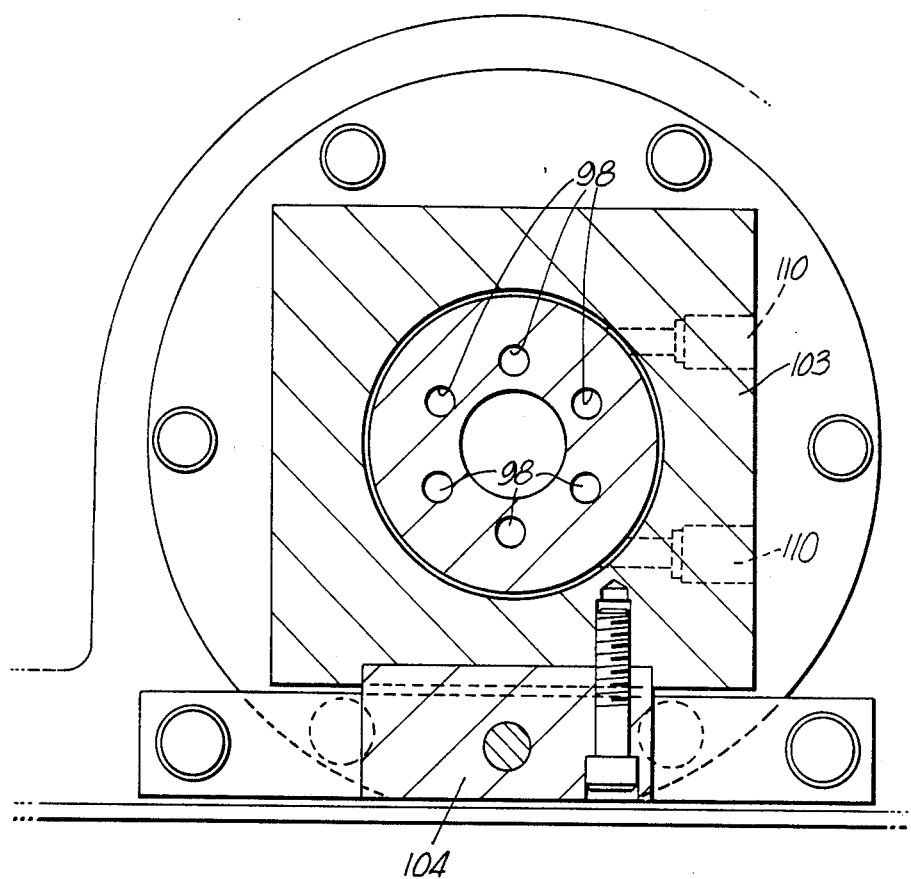
FIG. 4 is a cross sectional view of the device shown in FIG. 3 taken along the line IV—IV thereof.

It will therefore be seen that if an hydraulic power medium is applied to one of the holes 110, it will be in communication with a specific annular groove 100 and from there to a specific bore 98 in the shaft 94, and in turn to the left-hand end of the shaft 94 as viewed in FIG. 3. The associated hydraulically operated component, such as the rotor 58, is connected to be operated by the hydraulic medium at that end of the shaft 94. Operation can therefore be effected independently to the rotational position of the shaft 94 which may be changed continuously or intermittently.

The same device may be used to transmit power pneumatically instead of hydraulically.

It will be appreciated that the wire, tubing or other elongate material which is bent by the machine passes axially through the centre of the shaft 94 which is hollow for this purpose and lies on the axis of the bending machine.

I claim:

1. A bending machine for bending elongate material, comprising:
    (a) a support structure;
    (b) feed means which are supported by the support structure and which serve to feed such material along a feed axis of the machine;
    (c) a fixed member fixed to said support structure and having a cylindrical bore which extends along said feed axis;
    (d) a generally cylindrical rotary component which extends within said cylindrical bore so as to be rotatable about said feed axis;
    (e) a bending head supported by said support structure and connected to said rotary component for rotary movement relative to said support structure about said feed axis, to enable the bending head to bend such material in any selected imaginary plane which passes through said feed axis;
    (f) working-fluid-operated parts of said bending head;
    (g) an axial through-bore through said rotary component to enable such material to be fed to said bending head along said feed axis;
    (h) at least one further bore in said rotary component which extends in an axial direction along the rotary component, generally parallel with said axial through-bore, which further bore serves as a duct for working fluid which acts on said bending head;
    (i) at least one duct in said fixed member which also serves as a duct for such working fluid; and
    (j) at least one annular duct, between said fixed member and said rotary component, which connects the said at least one duct in said fixed member to said at least one further bore in said rotary component, irrespective of the angular position of said rotary component with respect to said fixed member.

2. A bending machine according to claim 1, in which the generally cylindrical rotary component comprises a shaft, in which there are a plurality of ducts in said fixed member, in which respective annular grooves, one for each duct in the fixed member, are spaced apart along the shaft, and in which there are a corresponding plurality of axially extending bores for working fluid through the shaft, so that each and every duct of the fixed member is in communication with its respective axially extending bore through the shaft irrespective of the angular position of the shaft relative to the fixed member.

3. A bending machine according to claim 2, in which there is an annular seal between each annular groove, to form a seal between the fixed member and the shaft, and so inhibit working fluid in one groove affecting that in another.

* * * * *